United States Patent
Frolov

(10) Patent No.: US 9,527,144 B2
(45) Date of Patent: Dec. 27, 2016

(54) EXTENDABLE WORKPIECE SUPPORT FOR A PORTABLE POWER TOOL

(71) Applicants: Robert Bosch Tool Corporation, Broadview, IL (US); Robert Bosch GmbH, Stuttgart (DE)

(72) Inventor: Andrew Frolov, Glenview, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 348 days.

(21) Appl. No.: 13/687,331

(22) Filed: Nov. 28, 2012

(65) Prior Publication Data
US 2013/0133496 A1 May 30, 2013

Related U.S. Application Data

(60) Provisional application No. 61/564,034, filed on Nov. 28, 2011.

(51) Int. Cl.
*B23D 47/02* (2006.01)

(52) U.S. Cl.
CPC .............. *B23D 47/02* (2013.01); *B23D 47/025* (2013.01); *Y10T 83/7722* (2015.04)

(58) Field of Classification Search
CPC ....... B23D 47/025; B23D 47/02; B23D 55/06; B23D 53/06; B23Q 1/74; B25H 1/04; B25H 1/00; B25H 1/14; A47B 1/05
USPC ....... 83/477.1, 477.2, 471.3; 144/286.1, 287, 144/129; 108/73–75; 193/35 TE; 269/901
See application file for complete search history.

(56) References Cited

U.S. PATENT DOCUMENTS

| | | | | |
|---|---|---|---|---|
| 103,347 | A * | 5/1870 | Lepp | 83/436.3 |
| 1,479,805 | A * | 1/1924 | Gutridge | A47B 1/02 108/85 |
| 1,639,825 | A * | 8/1927 | Wall | 108/74 |
| 1,994,538 | A * | 3/1935 | Segal | 108/73 |
| 2,366,499 | A * | 1/1945 | De Tosti | A47B 1/05 108/75 |
| 2,699,188 | A | 1/1955 | Caldwell | |

(Continued)

FOREIGN PATENT DOCUMENTS

| | | |
|---|---|---|
| JP | 51-74294 U | 6/1976 |
| TW | M242317 U | 9/2004 |

OTHER PUBLICATIONS

International Search Report and Written Opinion in corresponding PCT application (i.e., PCT/IB2012/002804), mailed Feb. 21, 2013 (9 pages).

(Continued)

*Primary Examiner* — Laura M Lee
(74) *Attorney, Agent, or Firm* — Maginot Moore & Beck LLP

(57) ABSTRACT

A table saw includes a base, a workpiece support structure, and an extension support assembly. The workpiece support structure is supported by the base and defines a workpiece support surface. The extension support assembly includes (i) a guide movable in relation to the base between a first guide position and a second guide position, (ii) an arm assembly movably supported by the guide, and (iii) a cam mechanism movable in relation to the base between a first cam position and a second cam position. Movement of the cam mechanism from the first cam position to the second cam position causes movement of the guide from the first guide position to the second guide position.

16 Claims, 3 Drawing Sheets

(56) References Cited

U.S. PATENT DOCUMENTS

| | | | |
|---|---|---|---|
| 3,342,226 A * | 9/1967 | Marcoux et al. | 144/286.1 |
| 4,640,326 A * | 2/1987 | Hewitt | 144/287 |
| 4,830,076 A * | 5/1989 | Feyer | 144/287 |
| 5,379,816 A * | 1/1995 | Charlton | 144/287 |
| 5,441,091 A * | 8/1995 | Collins | 144/287 |
| 5,526,856 A * | 6/1996 | Pedri | 144/287 |
| 7,827,890 B2 * | 11/2010 | Gass et al. | 83/102.1 |
| 2003/0075033 A1 * | 4/2003 | Speakman | 83/477.2 |
| 2011/0017041 A1 | 1/2011 | Frolov | |

OTHER PUBLICATIONS

Robert Bosch GMBH, Bosch 4100 Table Saw, available at least as early as Nov. 27, 2011.

* cited by examiner

EXTENDABLE WORKPIECE SUPPORT FOR A PORTABLE POWER TOOL

This application claims the benefit of U.S. provisional application No. 61/564,034, filed Nov. 28, 2011, the disclosure of which is incorporated herein by reference in its entirety.

FIELD

The present disclosure relates to power tools and, more particularly, to extendable workpiece support structures for power tools.

BACKGROUND

A portable table saw is a type of portable power tool that is used to cut and shape workpieces, such as framing lumber, plywood, and other materials. The typical portable table saw includes a base, a workpiece support structure, and a cutting assembly. During operation of the table saw, the base is positioned on a table, a table saw stand, or the ground. The workpiece support structure is connected to the base and defines a generally flat workpiece support surface on which a workpiece to be cut is positioned. The cutting assembly is at least partially positioned within the base and includes a saw blade for cutting the workpiece.

The typical portable table saw also includes handles attached thereto to assist in moving and positioning the table saw. Additionally, the typical portable table saw is constructed to have a weight that enables the typical user to easily lift and carry the tool.

To further increase the portability of the typical portable table saw, the workpiece support surface of the typical portable table saw is manufactured to have a smaller area than a workpiece support surface of the typical fixed position table saw. The smaller workpiece support surface of the portable table saw decreases the footprint of the portable table saw to enable users to pass the portable table saw through doorways, into the cargo compartment of most vehicles, and into many other locations.

While the workpiece support surface of the typical portable table saw increases the portability of the tool, the reduced workpiece support area may not be large enough to fully support a comparatively large workpiece. For example, when rip cutting a long section of construction lumber, the workpiece support surface supports only a portion of the workpiece, thereby reducing the convenience of cutting comparatively large workpieces with a portable table saw.

What is needed, therefore, is a portable table saw that is capable of supporting comparatively large workpieces without reducing the portability of the table saw.

SUMMARY

According to at least one embodiment of the disclosure a table saw includes a base, a workpiece support structure, and an extension support assembly. The workpiece support structure is supported by the base and defines a workpiece support surface. The extension support assembly includes (i) a guide movable in relation to the base between a first guide position and a second guide position, (ii) an arm assembly movably supported by the guide, and (iii) a cam mechanism movable in relation to the base between a first cam position and a second cam position. Movement of the cam mechanism from the first cam position to the second cam position causes movement of the guide from the first guide position to the second guide position.

BRIEF DESCRIPTION OF THE DRAWINGS

Features of the present disclosure will become apparent to those of ordinary skill in the art to which this device pertains from the following description with reference to the figures, in which.

DETAILED DESCRIPTION

For the purpose of promoting an understanding of the principles of the device described herein, reference will now be made to the embodiments illustrated in the figures and described in the following written specification. It is understood that no limitation to the scope of the device is thereby intended. It is further understood that the device includes any alterations and modifications to the illustrated embodiments and includes further applications of the principles of the device as would normally occur to one of ordinary skill in the art to which this device pertains.

Figure 1:
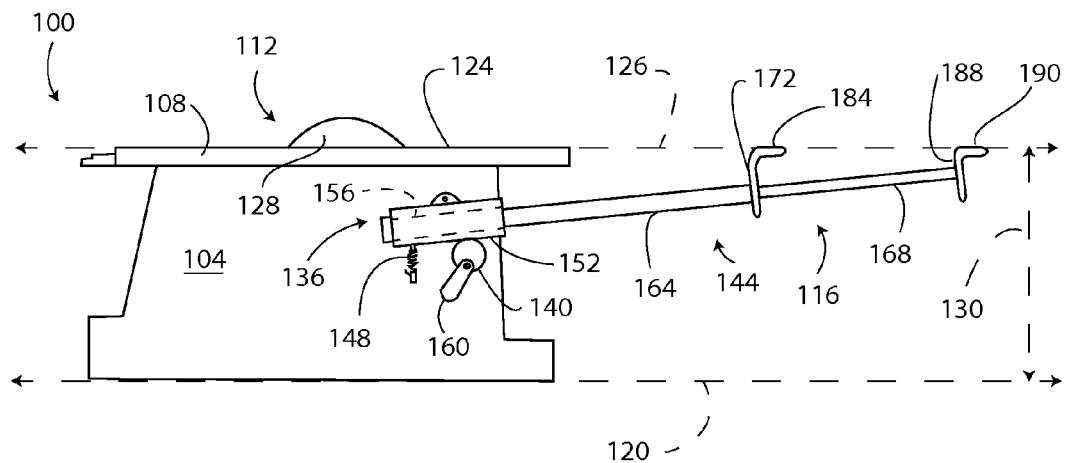
FIG. 1 is a side elevational view of a portable table saw as disclosed herein, showing an extension support assembly of the table saw configured to support a workpiece.

As shown in FIG. 1, a table saw 100 includes a base 104, a workpiece support structure 108, a saw assembly 112, and an extension support assembly 116. The base 104 is positioned on a support stand, a table, the ground, or another generally horizontal surface 120 during operation of the table saw 100.

The workpiece support structure 108 is supported by the base 104. The workpiece support structure 108 defines a workpiece support surface 124 on which a workpiece (not shown) is positioned. The workpiece support surface 124 defines a support plane 126 that is located at a height 130 above the horizontal surface 120 on which the base 104 is positioned. The support plane 126 is parallel or approximately parallel to the horizontal surface 120.

The saw assembly 112 includes a blade 128 and an electric motor (not shown). The blade 128 is configured to rotate when the electric motor is supplied with electrical energy. A portion of the blade 128 extends through a blade slot 132 (FIGS. 2 and 4) defined by the workpiece support surface 124, such that a portion of the blade is positioned above the workpiece support surface.

Figure 2:
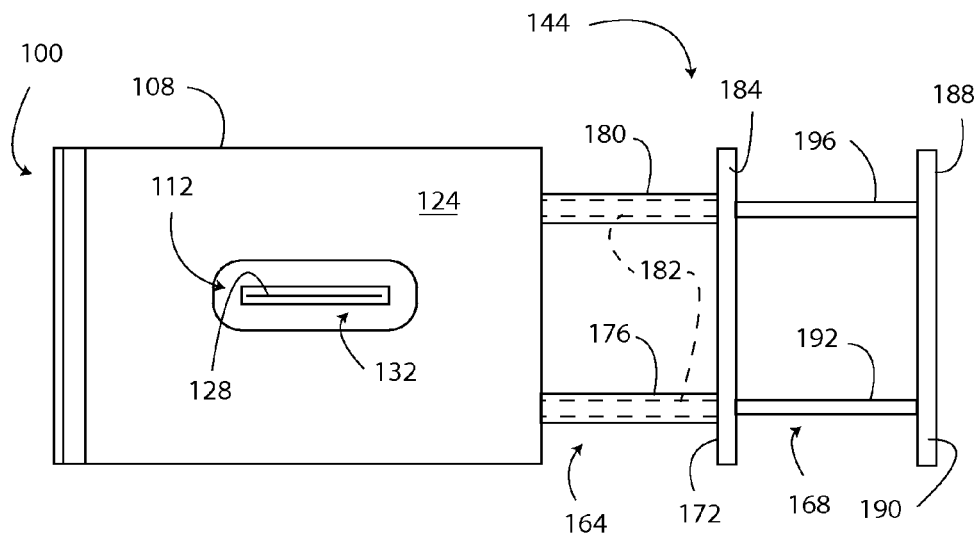
FIG. 2 is a top plan view of the table saw of FIG. 1, showing the extension support assembly in the same configuration as shown in FIG. 1.

Referring to FIG. 1, the extension support assembly 116 is used to support a workpiece that extends beyond the workpiece support surface 124 in an out feed direction. The extension support assembly 116 includes a guide 136, a cam mechanism 140, and an arm assembly 144. The guide 136 is pivotably attached to the base 104, such that the guide is movable in relation to the base to positions between and including a lowered guide position (FIGS. 3, 5, and 6) and a raised guide position (FIGS. 1 and 2). The guide 136 is fixedly positionable at any position between and including the lowered guide position and the raised guide position. The guide 136 is machined from aluminum. Alternatively, the guide 136 is formed from another rigid material, such as injection molded thermoplastic. Another guide (not shown) of the extension support assembly 116 is positioned on an opposite side of the base 104 and includes the same components and functions the same as the guide 136.

The table saw 100 further includes a spring 148, which is configured and arranged to bias the guide 136 toward the lowered guide position. In particular, the spring 148 biases the guide 136 against the cam member 140 to prevent pivoting of the guide 136 in response to the weight of a workpiece positioned on the arm assembly 144. A first end of the spring 148 is attached to the base 104, and a second end of the spring is attached to the guide 136. Another spring (not shown) is positioned on an opposite side of the base 104 and functions the same as the spring 148.

The guide 136 includes a sleeve structure 152, which defines a cylindrical passage 156 (shown in phantom in FIG. 1). At least a portion of the arm assembly 144 is positioned in the passage 156 defined by the sleeve structure 152.

The cam mechanism 140 is rotatably connected to the base 104 and is moveable in relation to the base to positions between and including a lowered cam position (FIGS. 3, 5, and 6) and a raised cam position (FIG. 1). The cam mechanism 140 includes an actuator lever 160 for rotating the cam mechanism. Another cam mechanism (not shown) of the extension support assembly 116 is positioned on an opposite side of the base 104 and includes the same components and functions the same as the cam mechanism 140.

Figure 3:
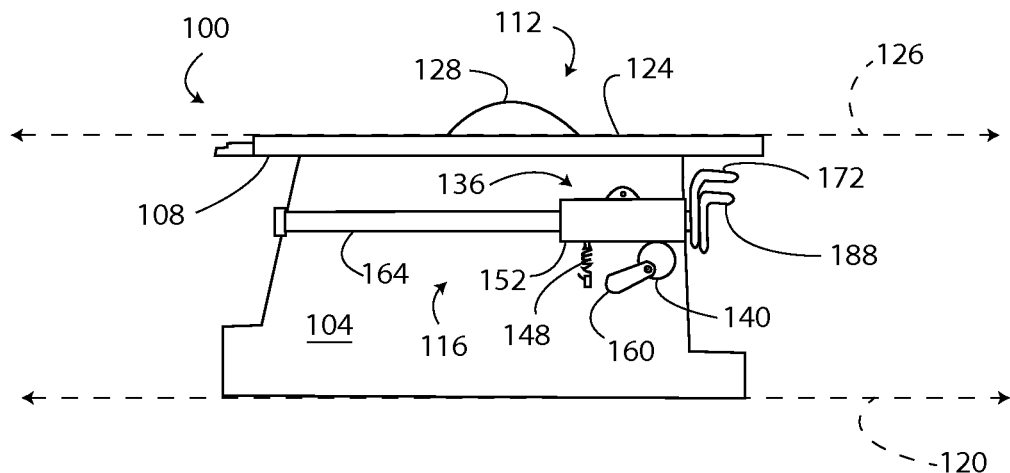
FIG. 3 is a side elevational view of the table saw of FIG. 1, showing the extension support assembly configured to be transported.
Figure 4:
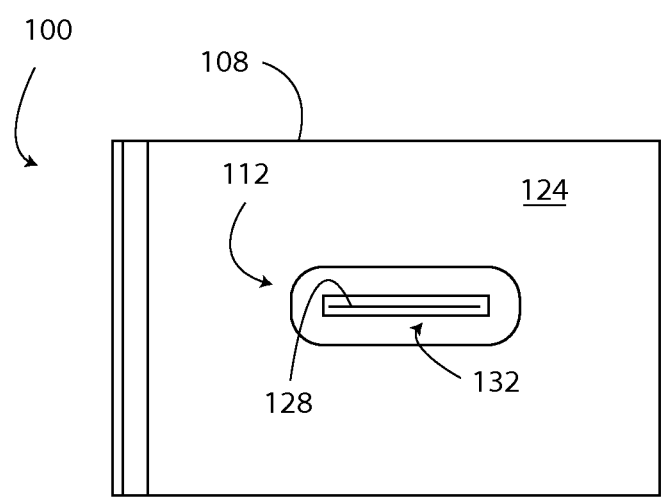
FIG. 4 is a top plan view of the table saw of FIG. 1, showing the extension support assembly in the same configuration as shown in FIG. 3.

As shown in FIGS. 1 and 2, the arm assembly 144 includes an outer arm component 164 and an inner arm component 168. The outer arm component 164 is movably supported by the guide 136. In particular, at least a portion of the outer arm component 164 extends through the passage 156 defined by the sleeve structure 152, such that the outer arm component is movable between an extended position (FIGS. 1, 2, 5, and 6) and a retracted position (FIGS. 3 and 4). The guide 136 includes locking members, such as detents (not shown), which secure the position of the outer arm component 164 in the extended and retracted positions. In another embodiment, the arm assembly 144 includes more than two arm components to enable the extension support assembly 116 to support an even longer workpiece.

As shown in FIG. 2, the outer arm component 164 includes a material support member 172 connected to a right outer arm 176 and a left outer arm 180. The right outer arm 176 is a hollow tube, which is movably positioned in the passage 156 defined by the sleeve structure 152 of the guide 136. The left outer arm 180 is a hollow tube, which is movably positioned in a passage defined by a sleeve structure of the other guide. The outer arm component 164 defines a receiving cavity 182 within the right outer arm 176 and the left outer arm 180.

As shown in FIG. 3, the "L-shaped" material support member 172 defines a workpiece contact surface 184, which is generally flat and is configured to support a workpiece that extends from the workpiece support surface 124. In another embodiment, the material support member 172 has an "S-shape" or a "C-shape."

Figure 5:
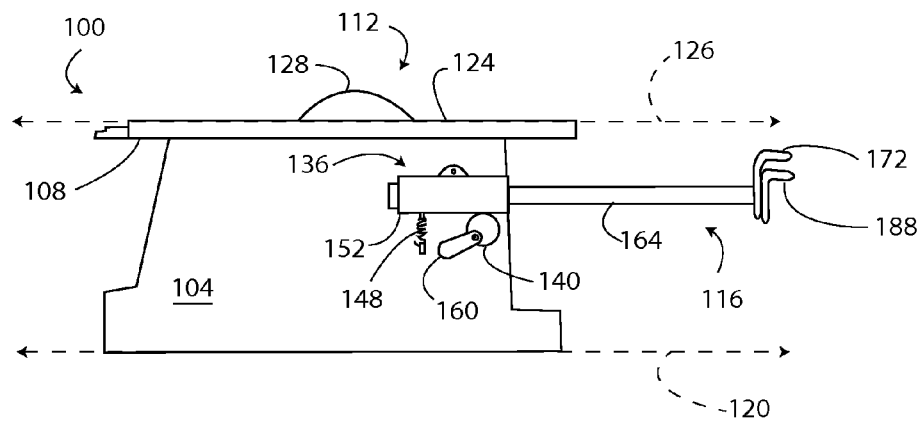
FIG. 5 is a side elevational view of the table saw of FIG. 1, showing the extension support assembly in an intermediate configuration.

With reference to FIG. 2, the inner arm component 168 is movably supported by the outer arm component 164, such that the inner arm component is movable in relation to the outer arm component to positions between and including an extended position (FIGS. 1, 2, and 6) and a retracted position (FIGS. 3, 4, and 5). The inner arm component 168 includes a material support member 188 connected to a right inner arm 192 and a left inner arm 196. The inner arm component 168 also includes locking members, such as a detents (not shown), which secure the position of the inner arm component 164 in the extended and retracted positions.

As shown in FIG. 3, the material support member 188 defines a workpiece contact surface 190, which is generally flat and is configured to support a workpiece that extends from the workpiece support surface 124. When the inner arm component 164 is in the retracted position, the material support member 188 is covered by the material support member 172. In another embodiment, the material support member 188 has an "S-shape" or a "C-shape."

At least a portion of the right inner arm 192 and the left inner arm 196 are positioned in the receiving cavity 182 of the outer arm component 164. In particular, at least a portion of the right inner arm 192 is positioned in the right outer arm 176, and at least a portion of the left inner arm 196 is positioned in the left outer arm 180. Accordingly, the inner arm component 168 is movable in a telescoping fashion in relation to the outer arm component 164. Additionally, when the inner arm component 168 is in the retracted position and the outer arm component 164 is in the retracted position, at least a portion of the inner arm component extends through the sleeve structure 152 of the guide 136.

In operation, the extension support assembly 116 is configurable in a first configuration for transporting the table saw 100 and in a second configuration for supporting a workpiece. As shown in FIG. 3, the extension support assembly 116 is configured for transporting the table saw 100. In this configuration, the cam mechanism 140 is in the lowered cam position, the guide 136 is in the lowered guide position, and the arm components 164, 168 are in the retracted positions. This makes the table saw 100 easily transportable because, as shown in FIG. 4, the extension support assembly 116 does not increase the "footprint" of the table saw, and the extension support assembly is positioned completely under the workpiece support structure 108. Furthermore, in this configuration, the workpiece contact surfaces 184, 190 (FIG. 1) are positioned at a height between the support plane 126 and the horizontal surface 120.

Figure 6:
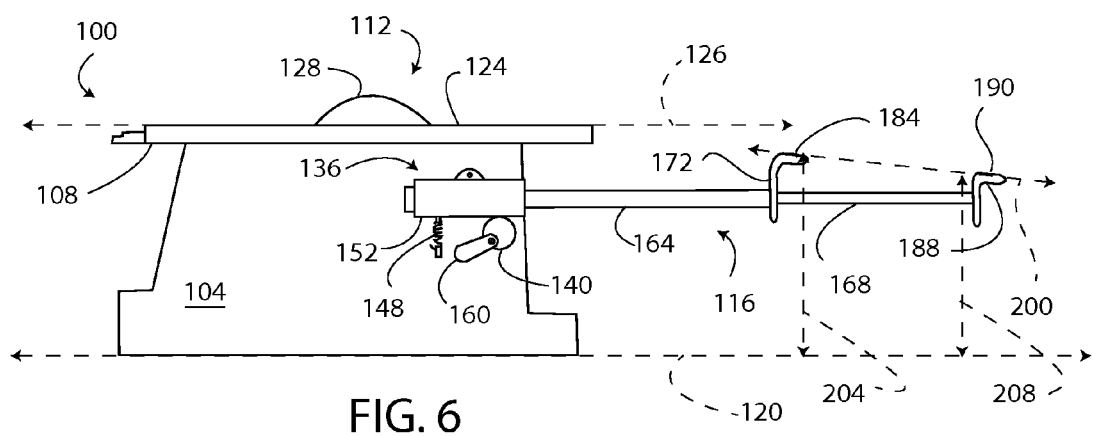
FIG. 6 is a side elevational view of the table saw of FIG. 1, showing the extension support assembly in another intermediate configuration.

As shown in FIG. 5, to configure the extension support assembly 116 to support a workpiece, first the outer arm component 164 is moved to the extended position by sliding the outer arm component away from the base 104, which causes the outer arm component to telescopically extend from the passage 156 of the sleeve structure 152. Next, as shown in FIG. 6, the inner arm component 168 is moved to the extended position by sliding the inner arm component away from base 104, which causes the inner arm component to telescopically extend from the receiving cavity 182. The locking members maintain the arm components 164, 168 in the extended position. In the configuration of FIG. 6, the workpiece contact surfaces 184, 190 are positioned between the support plane 126 and the horizontal surface 120, with the workpiece contact surface 184 being at a height 204 from the horizontal surface and with the workpiece contact surface 190 being at a height 208 from the horizontal surface. Also, in the position of FIG. 6, the workpiece contact surfaces 184, 190 are positioned in a plane 200 that intersects the support plane 126 and the horizontal surface 120.

With reference again to FIG. 1, after the arm components 164, 168 have been moved to the extended position, the cam mechanism 140 is rotated to the raised cam position. When the table saw 100 is supported on the horizontal surface 120, moving the cam mechanism 140 to the raised cam position causes the guide 136 to pivot from the lowered guide position (FIG. 6) to the raised guide position (FIG. 1). Pivoting of the guide 136 causes the workpiece contact surfaces 184, 190 to move toward the support plane 126. In particular, when the arm components 164, 168 are in the extended positions and the cam mechanism 140 is pivoted to the raised cam position, the workpiece contact surfaces 184, 190 are raised to the height 130, such that the workpiece contact surfaces lie in the support plane 126. In this configuration a workpiece that is moved from the workpiece support surface 124 in the out feed direction toward the workpiece contact surfaces 184, 190 is supported by the extension support assembly 116.

The extension support assembly 116 is shown in the figures and is described above as being attached to a portable table saw 100. However, the extension support assembly 116 is attachable to any type of power tool that has a workpiece support surface, including stationary power tools that are not configured to be easily transported. Additionally, in another embodiment, the extension support assembly 116 includes a bracket with an ark type opening or a slot and lock-nut with handle to secure the guide in a particular pivotal position.

The device described herein has been illustrated and described in detail in the figures and foregoing description, the same should be considered as illustrative and not restrictive in character. It is understood that only the preferred embodiments have been presented and that all changes, modifications, and further applications that come within the spirit of the device described herein are desired to be protected.

What is claimed is:

1. A table saw comprising:
   a base;
   a workpiece support structure supported by said base and defining a workpiece support surface; and
   an extension support assembly including (i) a guide mounted to said base and movable in relation to said base between a first guide position and a second guide position, (ii) an arm assembly movably supported by said guide and configured for linear movement relative to said guide, and (iii) a cam mechanism mounted to said base and movable in relation to said base between a first cam position and a second cam position,
   wherein movement of said cam mechanism from said first cam position to said second cam position causes movement of said guide from said first guide position to said second guide position,
   wherein said arm assembly includes a first arm component supported by said guide and movable between a first extended position and a first retracted position,
   wherein said first arm component includes a first material support member having a first workpiece contact surface,
   wherein said guide includes a sleeve structure, and
   wherein said first arm component extends through said sleeve structure.

2. The table saw of claim 1, wherein:
   said table saw is supported on a saw support surface, and movement of said cam mechanism from said first cam position to said second cam position causes movement of said first workpiece contact surface from a first height above said saw support surface to a second height above said saw support surface, and said second height is greater than said first height.

3. The table saw of claim 2, wherein:
   said workpiece support surface is located at a third height above said saw support surface, and
   said third height is greater than said first height.

4. The table saw of claim 1, further comprising a spring configured and arranged to bias said guide toward said first guide position.

5. The table saw of claim 4, wherein a first end of said spring is attached to said base and a second end of said spring is attached to said guide.

6. The table saw of claim 1, further comprising a saw assembly having a blade, wherein:
   said workpiece support structure includes a blade slot, and
   said blade extends through said blade slot.

7. The table saw of claim 1, wherein:
   said sleeve structure is configured to define a sleeve passage, and
   both said first arm component and said second arm component extend through said sleeve passage.

8. The table saw of claim 1, wherein:
   said guide is pivotably mounted to said base, and
   movement of said cam mechanism from said first cam position to said second cam position causes said guide to pivot from said first guide position to said second guide position.

9. The table saw of claim 1, wherein:
   said workpiece support surface defines a plane,
   when said first arm component is positioned in said first extended position, said first workpiece contact surface lies in said plane, and
   when said first arm component is positioned in said first retracted position, said first workpiece contact surface is positioned below said plane.

10. The table saw of claim 1, wherein:
    said workpiece support surface defines a plane,
    said arm assembly further includes a second arm component supported by said first arm component and movable between a second extended position and a second retracted position,
    said second arm component includes a second material support member having a second workpiece contact surface,
    when said first arm component is positioned in said first extended position and said second arm component is positioned in said second extended position, both said first workpiece contact surface and said second workpiece contact surface lie in said plane, and
    when said first arm component is positioned in said first retracted position and said second arm component is positioned in said second retracted position, both said first workpiece contact surface and said second workpiece contact surface are positioned below said plane.

11. The table saw of claim 1, wherein:
    said table saw is configured to be supported by a saw support surface,
    a footprint region is defined by said workpiece support surface between said saw support surface and said workpiece support surface, and
    said extension support assembly is positionable completely within said footprint region.

12. The table saw of claim 1,
    wherein said arm assembly further includes a second arm component moveable in relation to said first arm component between a second extended position and a second retracted position, and said second arm component includes a second material support member having a second workpiece contact; and wherein said cam mechanism is configured to move said guide so that said first workpiece contract surface, said second workpiece contact surface, and said workpiece support surface are configured to support a workpiece.

13. A table saw comprising:

a base;

a workpiece support structure supported by said base and defining a workpiece support surface; and an extension support assembly including (i) a guide mounted to said base and movable in relation to said base between a first guide position and a second guide position, (ii) an arm assembly movably supported by said guide and configured for linear movement relative to said guide, and (iii) a cam mechanism mounted to said base and movable in relation to said base between a first cam position and a second cam position, wherein movement of said cam mechanism from said first cam position to said second cam position causes movement of said guide from said first guide position to said second guide position, wherein said arm assembly includes a first arm component supported by said guide and movable between a first extended position and a first retracted position, wherein said first arm component includes a first material support member having a first workpiece contact surface, wherein said arm assembly further includes a second arm component movable in relation to said first arm component between a second extended position and a second retracted position, wherein said second arm component includes a second material support member having a second workpiece contact surface, wherein said first arm component defines a receiving cavity, and wherein at least a portion of said second arm component is positioned in said receiving cavity so that said second arm component is movable in telescoping fashion in relation to said first arm component.

14. A table saw, comprising:

a base;

a workpiece support structure supported by said base and defining a workpiece support surface; and an extension support assembly including (i) a guide movable in relation to said base between a first guide position and a second guide position, (ii) an arm assembly movably supported by said guide, and (iii) a cam mechanism movable in relation to said base between a first cam position and a second cam position, movement of said cam mechanism from said first cam position to said second cam position configured to cause movement of said guide from said first guide position to said second guide position, wherein said arm assembly includes (i) a first arm component supported by said guide and movable between a first extended position and a first retracted position, and including a first material support member having a first workpiece contact surface, and (ii) a second arm component movable in relation to said first arm component between a second extended position and a second retracted position, said second arm component including a second material support member having a second workpiece contact surface, and wherein said first arm component defines a receiving cavity and at least a portion of said second arm component is positioned in said receiving cavity so that said second arm component is movable in telescoping fashion in relation to said first arm component.

15. The table saw of claim 14, wherein:

said table saw is configured to be supported by a saw support surface, a footprint region is defined by said workpiece support surface between said saw support surface and said workpiece support surface, and said extension support assembly is positionable completely within said footprint region.

16. The table saw of claim 14, wherein:

said base is supported on a saw support surface, and movement of said cam mechanism from said first cam position to said second cam position causes movement of said first workpiece contact surface from a first height above said saw support surface to a second height above said saw support surface, and said second height is greater than said first height.

* * * * *